May 22, 1962 D. D. WILLARD 3,036,304

RESILIENT MAGNETIC DRUM

Filed Aug. 20, 1958

INVENTOR
DENNIS D. WILLARD
BY Wallace L. Madden Jr.
ATTORNEY

United States Patent Office 3,036,304
Patented May 22, 1962

3,036,304
RESILIENT MAGNETIC DRUM
Dennis D. Willard, Santa Clara County, Calif., assignor to International Business Machines Corporation, New York, N.Y., a corporation of New York
Filed Aug. 20, 1958, Ser. No. 756,119
5 Claims. (Cl. 346—74)

The present invention relates in general to magnetic recording apparatus and relates more particularly to a rotatable apparatus on which magnetic data may be recorded.

In the art of magnetic recording, large capacity recording systems often utilize a recording medium in the form of a rotatable metal drum having a plurality of circumferential channels or tracks thereon for storing recorded information. Such drums usually have associated therewith one or more transducers which cooperate magnetically with the moving drum for recording and reproducing the recorded data. However, the use of such drums having an inflexible recording surface presents a number of problems especially in recording at high bit or data densities, as is desirable in data processing applications. For example, in order to obtain a high bit density it is desirable that the transducer be positioned as closely as possible to the recording surface without actually contacting the surface if the surface is moving at a high speed. To achieve this close spacing it is essential that the outer surface of the recording drum be very accurately machined and that the drum be provided with precision bearings to produce accurate alignment of the recording surface relative to the transducers. These strict mechanical requirements result in considerable cost and size in producing a satisfactory drum of this type.

An additional problem with such drums arises from the fact that it is desirable that the velocity of the recording medium relative to the transducer be as high as possible in order to reduce the time required to record and/or reproduce data from the drum. However, these required high velocities produce a substantial centrifugal force stress on the drum rotor, especially if the drum is of substantial diameter, so that the drum assembly must necessarily be very ruggedly constructed to withstand the stresses.

In an effort to reduce the mechanical requirements for such drums, it has been proposed to utilize flexibly mounted transducers which are movable a limited distance relative to the inflexible drum surface to compensate for variations in the drum runout. Such flexibly mounted transducers may be maintained spaced from the drum surface either by a stream of air directed from the transducer toward the drum surface, or by a film of air resulting from laminar air flow over the drum surface during its rotation. The use of these flexibly mounted transducers does reduce the mechanical requirements for the drum, but the drum must still be relatively accurate, and hence expensive, in bearing alignment and concentricity.

To overcome the above disadvantages to the use of inflexible drum surfaces with or without flexibly mounted transducers, numerous alternative types of apparatus have been proposed. One of such alternative arrangements involves the use of a belt or endless loop of resilient material having a magnetic material on the outer surface thereof. This belt is disposed around, but spaced from, an inflexible inner member having openings therein for the passage of a suitable fluid, such as air, which is directed at the belt member so as to impart rotative movement thereto. The belt thus rotates under the action of the impinging fluid and magnetically cooperates with one or more transducers disposed adjacent the belt. While this apparatus eliminates the need for high precision bearings and machining of the drum surface, it has the disadvantages that the belt requires a very large amount of relatively high pressure air for operation and it is also subject to lateral shifting while rotating. This lateral shifting results from the fact that since the belt must be free to rotate, it cannot be completely constrained laterally, and thus a certain amount of lateral movement inherently results. Such lateral shifting is a distinct disadvantage, particularly where adjacent tracks or channels are spaced close to each other on the recording surface, as is desirable in high capacity data processing apparatus.

The present invention is directed to a magnetic recording device which overcomes the disadvantages of the above described prior art devices by providing a magnetic recording surface on a resilient member which is mechanically rotated to magnetically cooperate with one or more transducers disposed adjacent the recording surface. The recording surface is preferably a drum or cylinder formed of a flexible plastic material having a magnetic coating or layer on the outer surface thereof. At least one end of the drum is mechanically secured to a suitable face plate member which rotates to produce rotative movement of the drum relative to the associated transducer or transducers. As the drum rotates, the centrifugal force generated by the rotation causes the resilient material of the drum to flex outwardly, to thus position the recording surface closely adjacent the transducers. The recording surface is prevented from touching the transducers either by a stream of air directed from the transducer toward the record surface, or by the film of air which is dragged along the recording surface as a result of its rotation and forms a laminar air film between the recording surface and the transducer. By virtue of the resilience or flexibility of the recording surface, factors which would tend to vary the spacing of the transducer relative to the recording surface, such as variations in the concentricity of the drum drive bearings or variations in the transducer positioning mechanism, are automatically compensated for so that the transducer is spaced a constant distance from the recording surface at all times.

In one form of the present invention, the drum is provided at each end thereof with rigid face plate members which are mechanically connected to the drum and which are rotated to produce rotative movement of the recording surface. The material of which the drum is made preferably has sufficient flexibility to bow or flex under the centrifugal force generated by rotation to position the recording surface closely adjacent the transducer or transducers. However, if the velocity of rotation of the recording surface is insufficient to generate the required centrifugal force for flexing the recording surface, this flexing may be produced by introducing a suitable fluid under pressure, such as compressed air, into the interior of the drum assembly to exert a force against the recording surface tending to flex it outwardly into close proximity with the transducer.

It is therefore an object of the present invention to provide improved apparatus for magnetic recording.

It is a further object of the present invention to provide improved apparatus for magnetic recording utilizing a resilient member as a recording surface.

It is a further object of this invention to provide apparatus for magnetic recording using a mechanically rotated, substantially cylindrical resilient member having a magnetic coating on the surface thereof.

It is a further object of the present invention to provide apparatus for magnetic recording utilizing a mechanically rotated, substantially cylindrical resilient member which has a magnetic recording surface which flexes under the action of the centrifugal force produced by the rotation to dispose the recording surface closely adjacent an associated transducer.

It is an additional object of this invention to provide apparatus for magnetic recording utilizing a mechanically rotated, substantially cylindrical resilient member which has a magnetic surface for cooperating with an associated transducer and which has a fluid supplied to the interior thereof for flexing the recording surface to position the surface in close proximity to the associated transducer.

Other objects of the invention will be pointed out in the following description and claims and illustrated in the accompanying drawings which disclose, by way of example, the principle of the invention and the best mode which has been contemplated of applying that principle.

Figure 1:
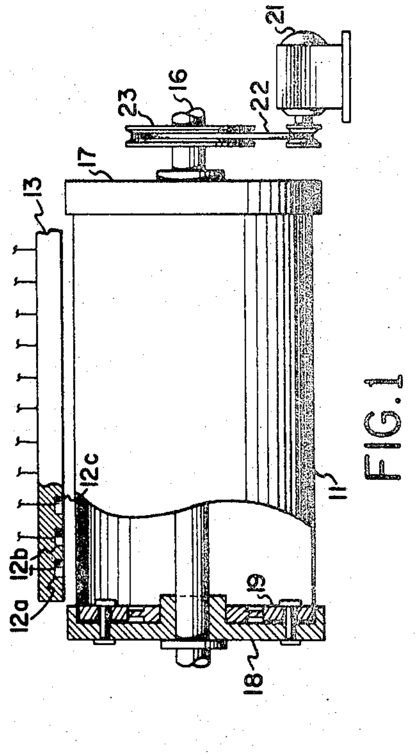
FIG. 1 is an elevational view, partly in section, illustrating one embodiment of the present invention, with the drum member at rest.

Referring to FIG. 1, by character of reference, numeral 11 designates a drum forming the recording surface of the present invention. The recording surface may be a substantially cylindrical drum formed of a suitable resilient material having a magnetic coating or layer on the outer surface thereof. Drum 11 may be formed of any suitable material having the required flexibility and strength, and I have found that drum 11 may be a thin sheet of plastic material sold under the trade name "Mylar," with a coating of magnetic material, such as iron oxide, on the outer surface thereof. Drum 11 has provided thereon a plurality of channels or tracks around the circumference thereof for recording data.

In the embodiment illustrated in FIG. 1, the recording surface formed by the outer surface of drum 11 is adapted to cooperate with a plurality of transducers **12*a*, 12*b*, 12*c*, etc., which are mounted in a mounting bar 13 and are disposed adjacent to the drum surface. Transducers 12 may be of any suitable type for recording and/or reproducing data from the different tracks on the surface of drum 11. Transducers 12 may be either fixed with respect to drum surface 11, or alternatively, the transducers may be positionable along the longitudinal axis of the drum for cooperation with different tracks on the drum surface. In the case of the latter construction, by selectively positioning the transducer mounting arm 13 longitudinally of the drum surface, random access to the different tracks on the drum 11** may be provided.

Drum 11 is adapted to be mechanically rotated to move the recording surface past transducers **12*a*, 12*b*, 12*c*, etc. In the embodiment illustrated in FIG. 1, this mechanical rotation is provided through a shaft 16 which is connected to a pair of face plate members 17 and 18. The ends of drum 11 are mechanically connected to face plate members 17 and 18 by any suitable means, such as the clamping ring arrangement illustrated in connection with face plate member 18. As there shown, face plate member 18 may be provided with an inner clamping ring 19 which is adjustable to firmly clamp the end of drum 11 between face plate member 18 and clamping ring 19 to rigidly secure the end of the drum to the face plate member. The motive power source for driving drum 11 may be of any suitable type, such as a motor 21 which is connected by means of a belt 22 to a sheave 23 secured to one end of shaft 16 for producing rotation of shaft 16, face plate members 17 and 18, and drum 11**.

Figure 2:
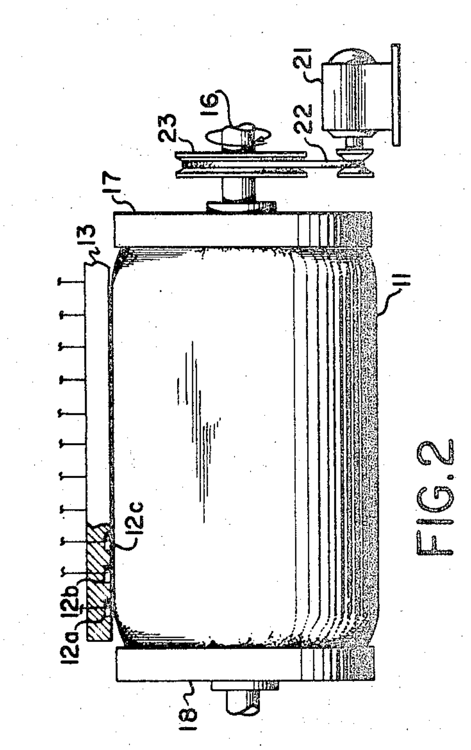
FIG. 2 illustrates the embodiment of FIG. 1 with the drum member rotating, showing the flexing of the drum surface.

As illustrated in FIG. 1, when the recording drum is at rest the surface thereof is spaced some distance from transducers 12, and the drum assumes substantially the shape of a cylinder. In this connection, the material of which drum 11 is formed preferably has sufficient rigidity to maintain its cylindrical form while at rest. When motor 21 is energized to mechanically rotate drum 11, the centrifugal force generated by such rotation causes the surface of drum 11 to flex outwardly, as shown in FIG. 2, to position the recording surface closely adjacent transducers **12*a*, 12*b*, 12*c*, etc. The exact configuration of the recording surface resulting from this flexing will depend upon a number of factors, but in general, it appears that the ends of drum 11 immediately adjacent face plate members 17 and 18 will assume a catenary form, as shown in exaggerated form in FIG. 2, while the portion of the recording surface intermediate these catenary sections will be substantially plane. This plane surface is, of course, highly desirable since it results in a substantially flat surface along the length of the recording surface over which transducers 12** operate.

It will be understood that the surface of drum 11 preferably does not actually touch or contact the transducers 12, since such contact would result in undesirable wear on both the transducers and the drum surface. To prevent such contact, the transducers may be of the type in which a stream of air is directed from the transducer toward the record surface to maintain a spacing between these elements. Alternatively, the transducers may be of the so-called "gliding head" type, in which a thin film of air which is dragged around the recording surface as a result of its rotation serves as a cushion or spacer between the transducer and the recording surface. In general, either of these types of flexibly mounted transducers may be used, but where the velocity of rotation of the recording surface is low, the use of air heads is dictated, since the lower rotational velocity of the recording surface is insufficient to generate the required air flow to support a "gliding head" transducer.

When the "gliding head" type transducer is used, the laminar air flow resulting from the air drag of the moving drum surface maintains a thin film of air between the transducers and the recording surface to prevent actual contact between these elements. Thus, since the drum 11 is resilient, the outer surface thereof under the action of centrifugal force will tend to align itself closely adjacent transducers 12, while being maintained slightly spaced therefrom by the above described air film. Hence, even if the spacing between the drum surface and the different transducers is not constant when the drum is at rest, such as might result from variations in the mounting of the transducers in mounting arm 13, the surface of drum 11 will still be positioned closely adjacent the transducers while rotating and separated therefrom only by the thin film of air described above. Similarly, if there are variations or irregularities in the drive mechanism for the drum, such as might result in variations in the concentricity of the drum surface, these irregularities are compensated for by the flexing action of the drum surface while rotating to maintain the entire working surface of the drum spaced a substantially constant distance from all of the transducers during the entire rotative cycle of the drum.

Figure 3:
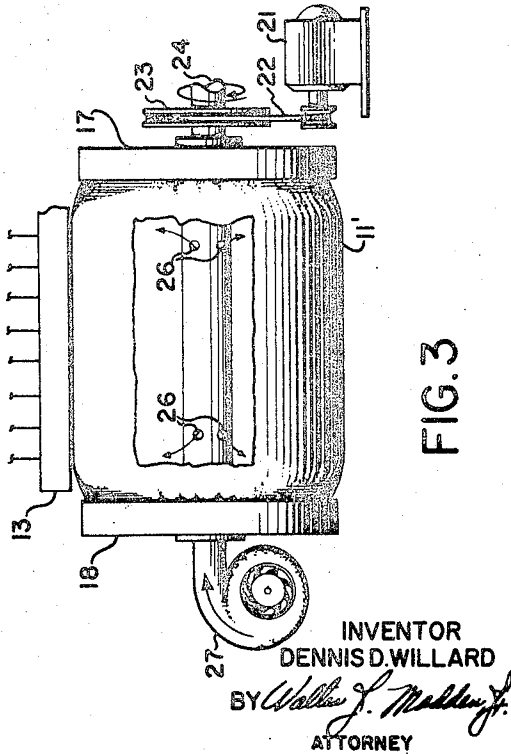
FIG. 3 illustrates an alternative embodiment of the present invention utilizing a fluid to assist in producing the flexing of the recording surface.

In the embodiment illustrated in FIGS. 1 and 2, it was assumed that the centrifugal force resulting from rotation of the drum provided sufficient flexing of the drum surface to position it closely adjacent the transducers. However, if this centrifugal force is not sufficient to produce the desired flexing of the drum surface, such flexing may be produced by other means such as shown in the embodiment of FIG. 3. In FIG. 3, a drum 11' is again secured between face plates 17 and 18 and is mechanically rotated by means of motor 21 through a shaft 24.

Shaft 24 extends through the interior of drum 11′ and is provided with at least one opening 26 which communicates with the interior of drum 11′. A suitable fluid is supplied through openings 26 into the interior of drum 11′ to exert a force against the interior of the drum tending to flex the outer surface outwardly against transducers 12 in mounting bar 13. Such fluid may be of any suitable type, such as air supplied by means of a blower 27 through an opening in shaft 24 to openings 26 and the interior of drum 11′. When drum 11′ is rotating, therefore, the air supplied by blower 27 through openings 26 causes the surface of drum 11′ to flex outwardly to position the outer surface of the drum closely adjacent transducers 12, while the thin air film between the transducers and the recording surface prevents actual contact between these elements, as discussed above in connection with the embodiment of FIGS. 1 and 2.

Figure 4:
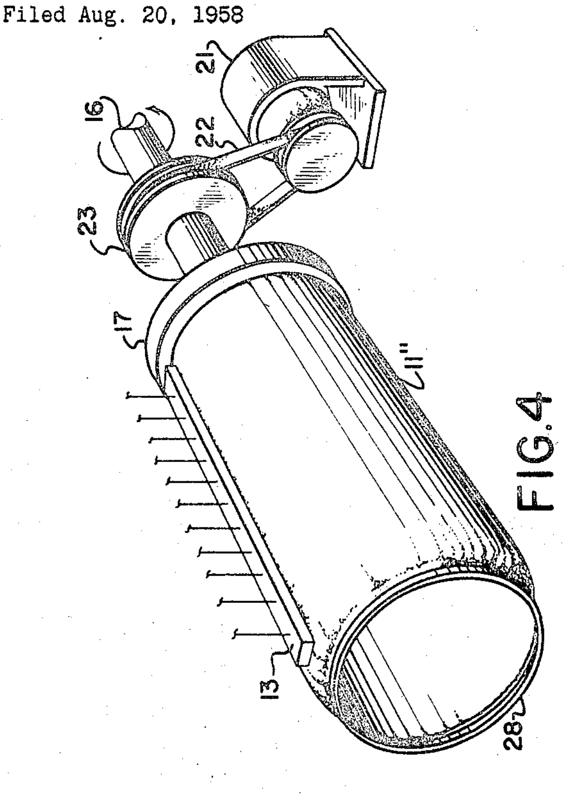
FIG. 4 illustrates an additional alternative embodiment of the present invention utilizing one face plate member on one end of the recording drum and a stiffening member at the other end.

In the embodiments illustrated in FIGS. 1, 2 and 3, drum member 11 is provided with face plate members at each end thereof which totally enclose the ends of the drum. However, this total enclosure is not necessary, and the device may be constructed as shown in FIG. 4. There a drum 11″ is provided at one end thereof with face plate member 17 which is driven through shaft 16, sheave 23 and pulley 22 by motor 21. The other end of drum 11″ is provided with an open hoop or stiffening member 28 which preferably fits inside the end of drum 11″ to maintain the drum in substantially cylindrical form. As drum 11″ rotates, stiffening member 28 maintains that end of drum 11″ in substantially cylindrical form, so that the drum surface is flexed outwardly against transducers 12 in mounting bar 13, substantially as described above in connection with the embodiments of FIGS. 1, 2 and 3.

Thus, it will be seen that I have provided improved magnetic recording apparatus which is simple and inexpensive, and results in a small, substantially constant spacing between a recording surface and its associated transducers, thereby permitting high recording densities to be obtained on the recording surface.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for use in magnetic recording comprising a substantially cylindrical resilient member having a magnetic material on one surface thereof, means mechanically connected only at the ends of said member for rotating said member to flex said resilient member outwardly, and transducer means disposed adjacent said resilient member when flexed for magnetically cooperating therewith during said rotation.

2. Apparatus for use in magnetic recording comprising a substantially cylindrical resilient member having a magnetic material on the outer surface thereof, means mechanically connected only to one end of said resilient member for producing rotation of said member to flex said resilient member outwardly, and transducer means disposed adjacent said resilient member when flexed, for magnetically cooperating therewith during said rotation.

3. Apparatus for use in magnetic recording comprising a substantially cylindrical resilient member having a magnetic material on the outer surface thereof, means mechanically connected to one end of said resilient member for producing rotation of said member, means for supplying a fluid under pressure to the interior of said cylindrical member to produce an outward flexing of said member, and transducer means disposed adjacent said member for magnetically cooperating therewith during said rotation.

4. Apparatus for use in magnetic recording comprising a substantially cylindrical resilient member having a magnetic material on the outer surface thereof, a pair of rigid face plate members secured only to the ends of said member, means connected to at least one of said face plate members for mechanically rotating said resilient member to flex said resilient member outwardly, and transducer means disposed adjacent said resilient member when flexed for magnetically cooperating therewith during said rotation.

5. Apparatus for use in magnetic recording comprising a substantially cylindrical resilient member having a magnetic material on the outer surface thereof, a pair of rigid face plate members secured to the ends of said member, means connected to at least one of said face plate members for mechanically rotating said resilient member, means for supplying a fluid under pressure to the interior of said resilient member to flex said resilient member outwardly, and transducer means disposed adjacent said flexed resilient member for magnetically cooperating therewith during said rotation.

References Cited in the file of this patent

UNITED STATES PATENTS

| | | |
|---|---|---|
| 1,545,897 | Haynes | July 14, 1925 |
| 2,710,191 | Williams | June 7, 1955 |
| 2,787,750 | Jones | Apr. 2, 1957 |
| 2,862,845 | Szegvari | Dec. 2, 1958 |
| 2,883,475 | Ridler et al. | Apr. 21, 1959 |

FOREIGN PATENTS

| | | |
|---|---|---|
| 657,494 | Great Britain | Sept. 19, 1951 |
| 463,505 | Great Britain | Apr. 1, 1937 |